PHASE SHIFT APPARATUS

Filed Sept. 28, 1959

INVENTORS
CARROLL F. AUGUSTINE
JAMES CHEAL
BY VINCENT J. McHENRY
Richard T. Seeger
ATTORNEY

3,081,440
PHASE SHIFT APPARATUS

Carroll F. Augustine and Vincent J. McHenry, Farmington, and James Cheal, Inkster, Mich., assignors to The Bendix Corporation, a corporation of Delaware
Filed Sept. 28, 1959, Ser. No. 842,942
4 Claims. (Cl. 333—31)

This invention pertains to a phase shift apparatus and, more particularly, to an apparatus for shifting the phase of a signal in a linear ratio to an input motion.

It is an object of this invention to provide a phase shift apparatus of a small size and rugged construction which has a linear relation between input movement and phase shift, which requires relatively low driving torque for operating the input member, which does not require calibration, and which is capable of mass production.

It is an object of this invention to provide a hybrid junction having an input, an output, and two side members extending therefrom so that an input signal will enter only the side members with the signal in each side member being reflected back and separating at the junction into portions going towards the input and the output; the input portions cancel one another and the output portions add to one another, and means for varying the effective length of the side members so that the distance the signal travels in the side members is accordingly varied and the phase of the signal in the output member is correspondingly changed.

It is a further object to provide in such phase shift device a coaxial cable for each of the side members with a portion of the coaxial cable removed to expose the center conductor and with the coaxial cables being arranged in a circular path so that an arm pivoted at the center of said path will connect or short the inner and outer conductors of the coaxial cable and rotation of the arm will change simultaneously the effective lengths of the coaxial cables.

It is a further object to provide in the aforementioned phase shifter a matching member comprising a sheet bent at the middle to form a corner with the corner contacting the leads to the hybrid junction and with the sheets being of sufficient area to receive substantially all of the field surrounding the end of the junction.

These and other objectives will become more apparent when a preferred embodiment is considered in connection with the drawing in which.

Figure 1:
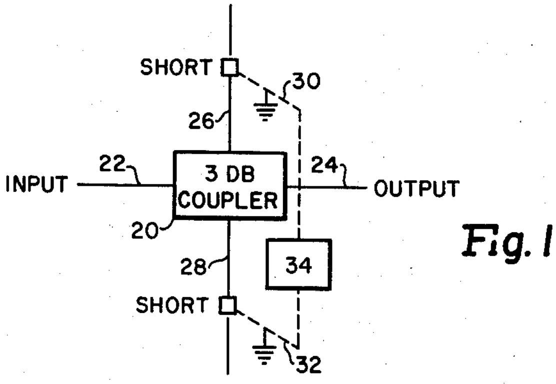
FIGURE 1 is a schematic representation of this invention.

In FIGURE 1 is shown a three decibel hybrid junction or coupler 20 having an input 22, an output 24 and side members 26 and 28. Connecting each of the side members 26 and 28 to ground are, respectively, contacts 30, 32 which are movable simultaneously in opposite directions by ganging means 34 to keep the lengths of the members 26, 28 equal as they are varied. A signal entering input 22 is divided by junction or coupler 20 so that equal portions enter members 26 and 28 where they are reflected and reenter the coupler 20. Here the signal from each arm is divided equally to input 22 and output 24 but the signal portions from members 26, 28 directed towards input 22 are out of phase and cancel and the portions directed towards output 24 are in phase and add. By varying the positions of contacts 30 and 32, the length of the paths traveled by signals entering members 26 and 28 are accordingly varied. This, in turn, will correspondingly change the phase of the signal at output 24. Changing the length of members 26, 28 one-half wavelength will result in a phase shift of 360° at output 24.

Figures 2, 4:
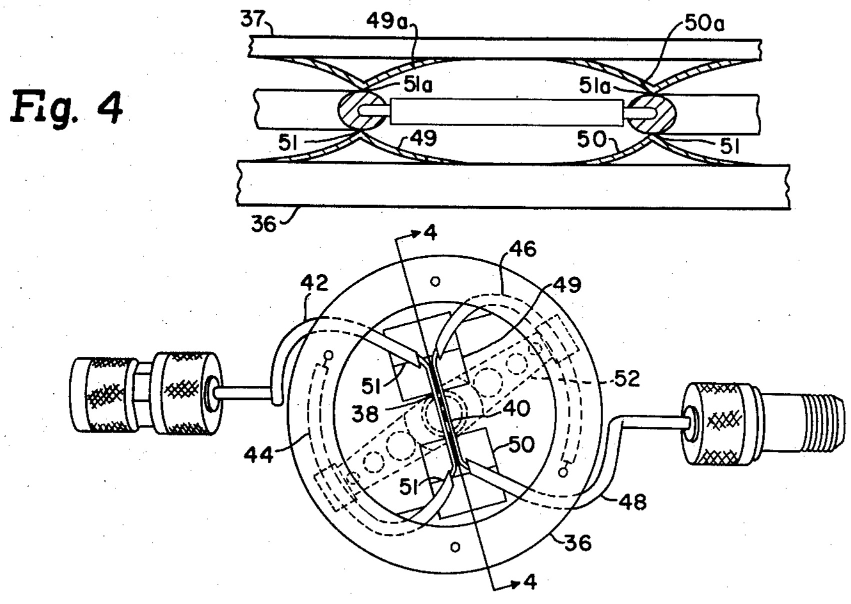
FIGURE 2 is a plan view of a preferred embodiment of this invention with the cover means removed.
FIGURE 4 is a section taken at 4—4 of FIGURE 2.
Figure 3:
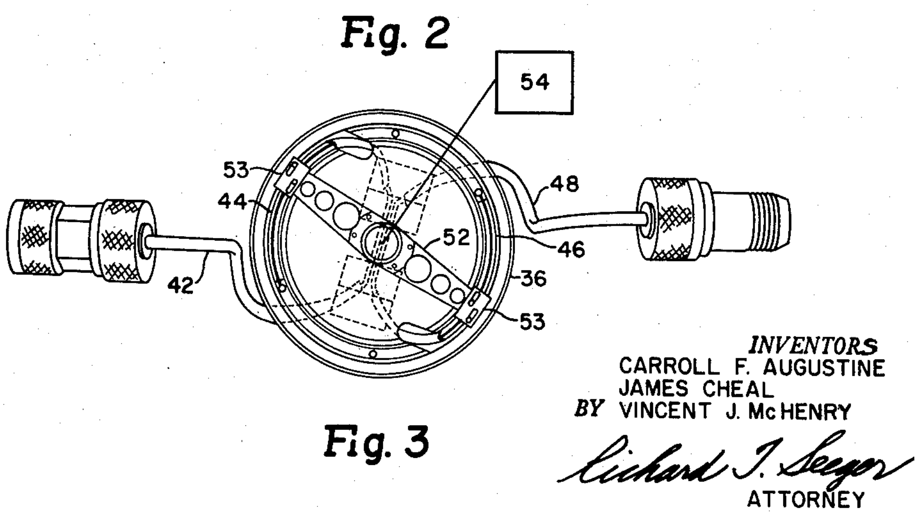
FIGURE 3 is a plan view from the opposite side of the embodiment of FIGURE 2.

In FIGURES 2 and 3 is seen a preferred embodiment for accomplishing the objectives of this invention. A circular housing 36 has mounted on one side thereof a pair of flat strips 38, 40 which act as a three decibel hybrid junction and are equal in length to one-quarter of the center wavelength of the frequency band for which the phase shifter is designed. The strips are made of brass, are .125 inch high and are spaced .031 plus or minus .002 inch apart. Connected to one end of strip 38 is an input 42 and connected to the other end of strip 38 is a side member 44. Connected to strip 40 at one end is a side member 46 and at the other end output 48. Side members 44, 46 are coaxial cables having an outside diameter of .141 inch and having a portion wherein the outer conductor and insulation are removed on one side thereby exposing the center conductor. Input 42 and output 48 are also coaxial cables and the outer conductors of all the cables are cut away at a taper at the cable ends connected to strips 38, 40 to provide a smooth electrical transition.

Another feature of this invention, which is best illustrated in FIGURE 4, is the means used to match the impedance of cables 42, 44, 46 and 48 to the strips 38, 40 and to provide a radio frequency ground to the cables. A pair of tent shaped matching members 49, 50 are placed under the cables connected to strips 38, 40 and a pair of members **49*a*, 50*a* are placed over the cables with the corners 51 and 51*a* of the members contacting the outer conductors of the respective cables midway along the tapered cuts of the outside conductor and insulation. The ends of members 49, 50 contact housing 36 and the ends of members 49*a*, 50*a* contact cover 37 which is bolted to housing 36 with housing 36 and cover 37 being at ground potential. Members 49, 50 and 49*a* and 50*a* in this embodiment are made of beryllium copper and are under a slight compression so that the corners 51 and 51*a* will be urged against their respective coaxial cables. In this embodiment the members 49, 50, 49*a* and 50*a* are .72 inch on a side and are large enough to include the field area near the respective ends of the strips 38, 40** to provide maximum matching characteristics.

Members 44, 46 are curved to follow and are fastened to the circumference of circular housing 36. A connecting or shorting arm 52, which is pivoted at the center of housing 36, has at its ends adjustable members 53, **53*a* which connect or short the center conductor of the coaxial cable to the outer conductor, thus establishing the effective length of the cable. Members 53, 53*a* are adjustable circumferentially until the distance along side member 44 between the strip 38 and the member 53 is equal to the distance along the side member 46 between strip 40 and member 53*a*. Rotation of arm 52 will simultaneously vary the position of members 53, 53*a* along cables 46, 48 to maintain the members 46, 48 at equal lengths and provide variable effective lengths. Means 54 may be provided for turning arm 50**.

A signal entering input 42 would be divided equally between members 44, 46 in which members the signal would travel to that portion of the member which is shorted by contacts 53 and then be reflected to the hybrid junction formed by strips 38, 40. Here the signal from the side members 44, 46 will be divided towards the input 42 and output 48 but with the portions of the reflected signals directed towards input 42 being of opposite phase so that they will cancel and the portions of the signals directed towards output 48 being of like phase so that they will add. Movement of an arm 52 by means 54 will change the length of signal travel in the side members and hence will vary the phase of the signal at output 48.

The unit shown is very compact, the diameter of housing 36 being three inches, takes very small torque to turn arm 52 and has very good linearity characteristics between the movement of arm 52 and the phase shift for output 48. In addition a unit of this type needs no calibration and is susceptible to mass production.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

Having thus described our invention, we claim:

1. A phase shifter comprising a pair of parallel, closely spaced flat strips, an input member, and output member, and two side members, said input member being connected to only one of said strips at only one end of said strips, said output member being connected only to the other of said strips at only the other end of said strips, a side member being connected to each of the remaining free ends of said strips, said side members being disposed about said closely spaced flat strips, adjusting means for adjusting the effective length of said side members to equal lengths to change the phase of the signal going from said input to said output member, said adjusting means comprising a pivoted arm engageable with each of said side members to simultaneously vary the effective lengths of said side members, said strips being equal in length to approximately one quarter the length of a wavelength in a predetermined portion of the frequency band for which the shifter is designed to operate.

2. The phase shifter of claim 1 wherein said side members each comprise a coaxial cable having an inner and outer conductor separated by insulation, said adjusting means including a member for connecting the inner and outer conductor of each of said cables at various positions along said cables.

3. The phase shifter of claim 2 having a cover on either side thereof extending about the elements thereof, said covers being at ground potential, said input and output members being coaxial cables, first and second pairs of conductive matching members aligned transversely to said strips adjacent either end, said first pair of conductive members contacting said covers and the outer conductors of said input member and the adjacent side member, said second pair of conductive members contacting said covers and the outer conductors of said output member and said other side member, said conductive members being of sufficient area to cover substantially all of the fields adjacent the respective ends of the parallel strips.

4. The phase shifter of claim 2 wherein said side members are in arcuate paths having a radius with a common center, said adjusting means being pivoted at said common center, one end of said adjusting means arm electrically connecting the inner and outer conductors of one side member, and the other end of said conducting means electrically connecting the inner and outer conductor of the other side member.

References Cited in the file of this patent

UNITED STATES PATENTS

| | | |
|---|---|---|
| 2,404,399 | Pickles | July 23, 1946 |
| 2,584,600 | MacKimmie | Feb. 5, 1952 |
| 2,709,789 | Worrell | May 31, 1955 |
| 2,794,144 | White | May 28, 1957 |
| 2,881,433 | Mattingly | Apr. 7, 1959 |
| 3,005,985 | Cohn et al. | Oct. 24, 1961 |

OTHER REFERENCES

Arditi: "Experimental Determination of the Properties of Murostrip Components," Electrical Communication, December 1953, pages 283–293.

Barrett: "Etched Sheets Serve as Microwave Components," Electronics, June 1952, pages 114–118.